Sept 17, 1957  W. S. TOUCHMAN  2,806,647
QUOTIENT CALCULATING DEVICE
Filed Oct. 25, 1952  5 Sheets-Sheet 1

INVENTOR.
William S. Touchman
BY
Moore, Olson & Trexler
Attys.

Sept 17, 1957  W. S. TOUCHMAN  2,806,647
QUOTIENT CALCULATING DEVICE
Filed Oct. 25, 1952  5 Sheets-Sheet 2
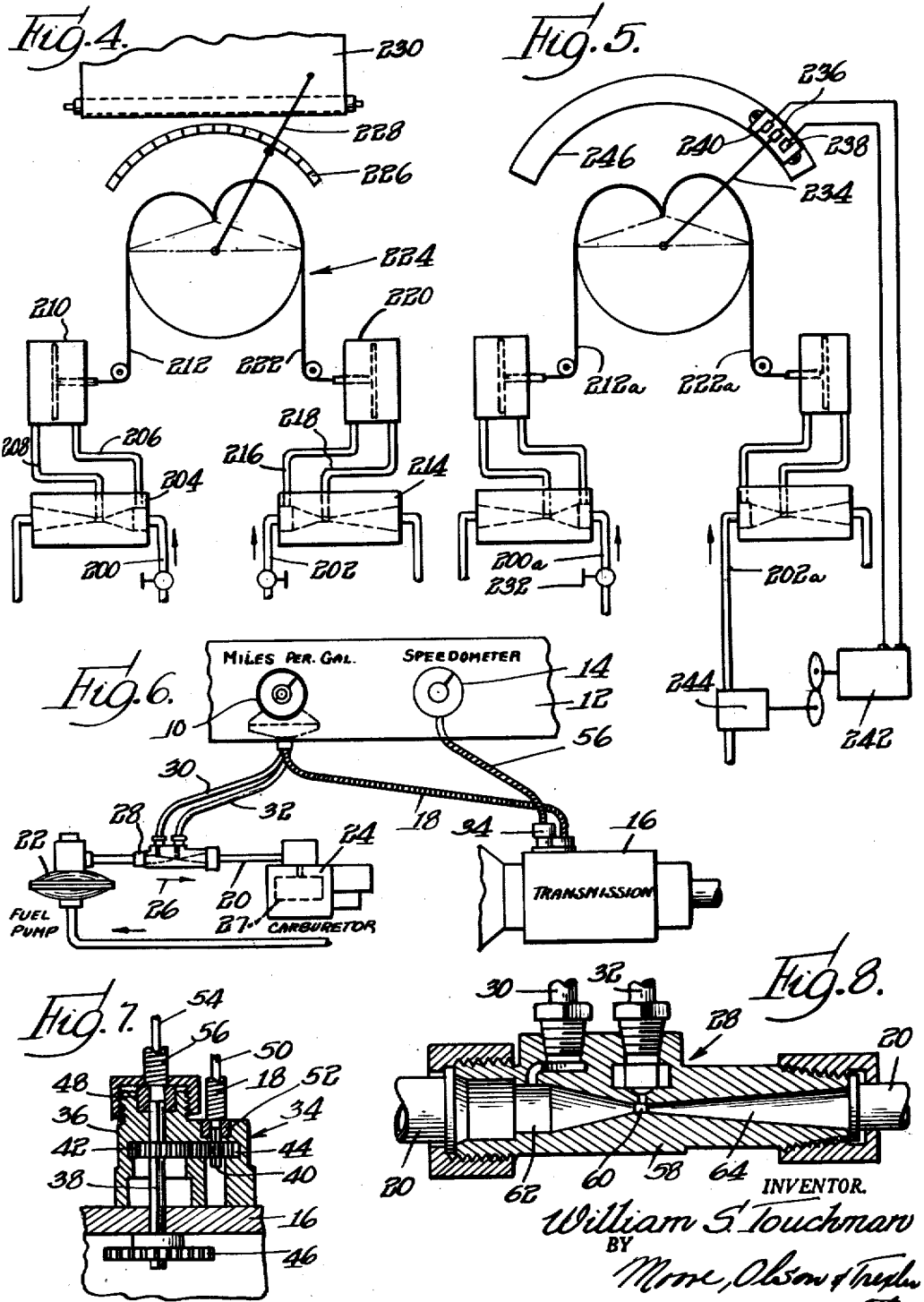

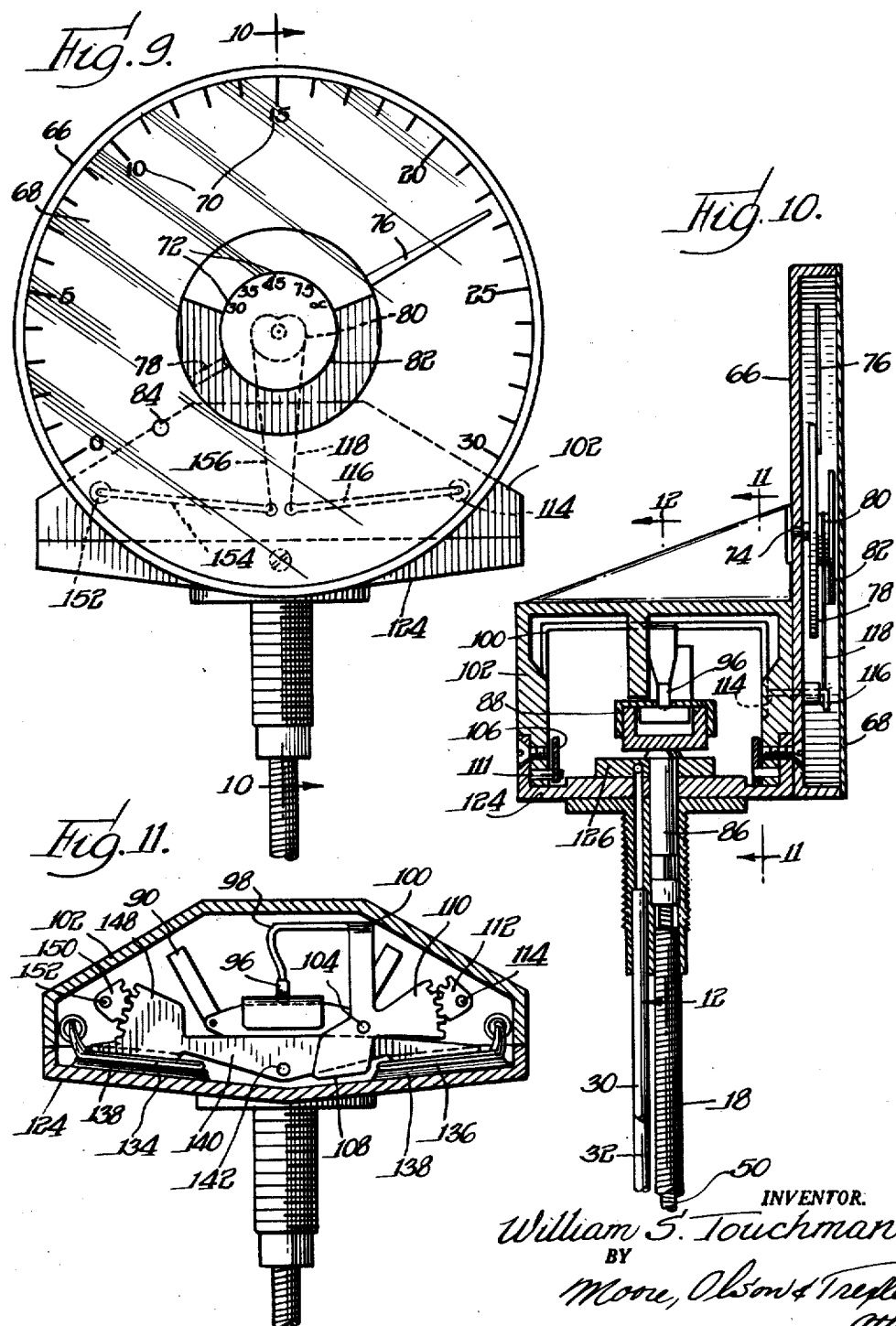

Sept 17, 1957 W. S. TOUCHMAN 2,806,647
QUOTIENT CALCULATING DEVICE
Filed Oct. 25, 1952 5 Sheets—Sheet 4
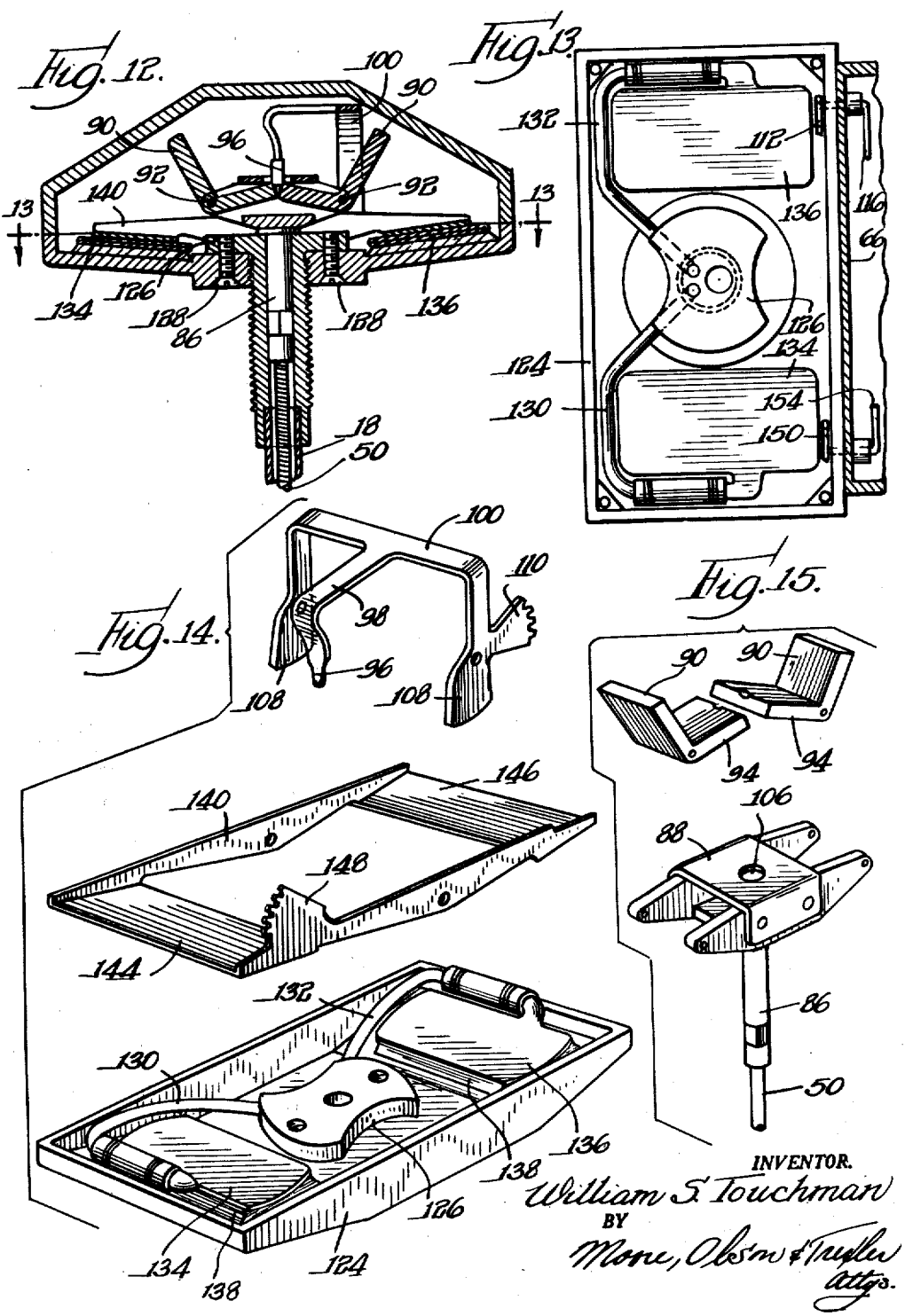
INVENTOR.
William S. Touchman Sept 17, 1957      W. S. TOUCHMAN      2,806,647
QUOTIENT CALCULATING DEVICE
Filed Oct. 25, 1952      5 Sheets-Sheet 5
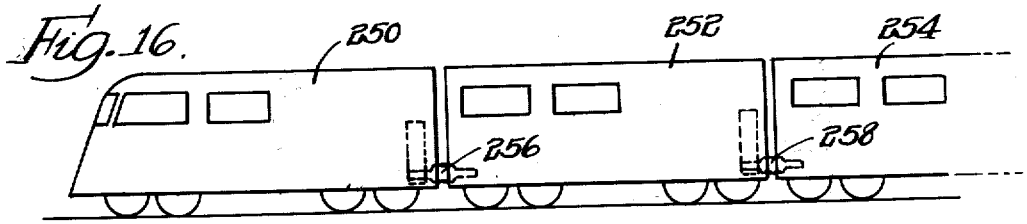
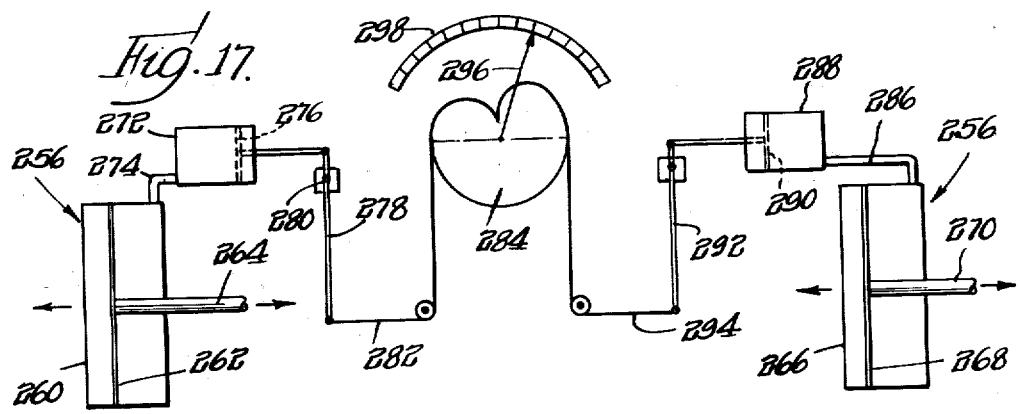
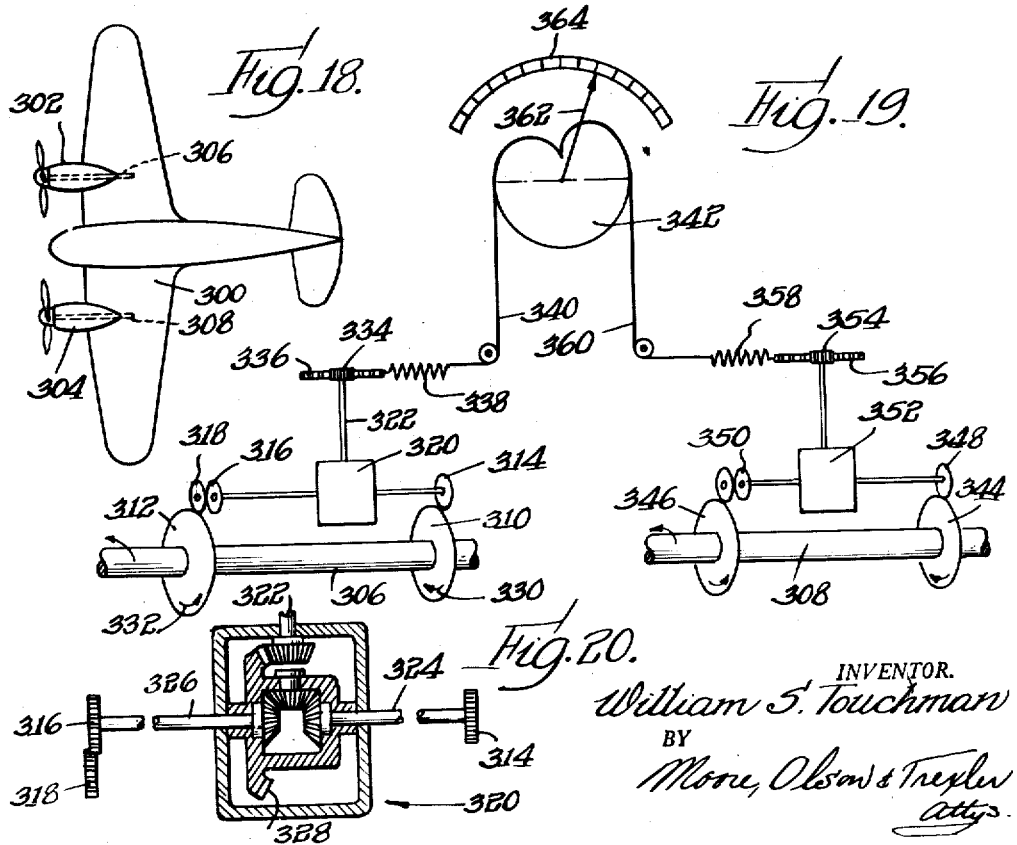

United States Patent Office 2,806,647
Patented Sept. 17, 1957

2,806,647

QUOTIENT CALCULATING DEVICE

William S. Touchman, Yellow Springs, Ohio, assignor to Perc C. Sorenson and Lee Jewell, Wauwatosa, Wis.

Application October 25, 1952, Serial No. 316,888

27 Claims. (Cl. 235—61)

This invention relates to calculating devices, and more specifically to force combination quotient determining mechanisms. This application is a continuation-in-part of my co-pending application, Serial No. 233,541, now abandoned, filed June 26, 1951.

In various applications in industry it is desirable to provide an instantaneous and continuous determination of values in quotient relationship, the determination being in such form that it may be advantageously utilized to provide either a scale indication, or some correlated control function, as the case may be.

An example of use resides in efficiency determining devices for engines or the like, which in the laboratory or upon the test block may take the form specifically of efficiency calculating devices, or in the case of automobiles, boats or aircraft, may take the form of devices for determining the relation of the ultimate effective work done in respect to fuel consumed, or a characteristic thereof, viz., miles travelled per gallon of fuel used, or the like.

Other instances of use, in wide application, reside in proportioning devices of general application, wherein it is desired to provide indication or control, continuously and instaneously, of values in quotient relationship; such for example as in load balancing, or fluid flow control installations. Thus in an installation wherein values are operating in quotient relationship, as for example in a fluid control system wherein it is desired to maintain the flow of one fluid in desired proportion with the variable flow of another, it is desirable to provide an instantaneous intercontrol between the two, or an indication of the quotient relationship between the two flow rates.

In accordance with the present invention, a quotient calculating mechanism is provided which effects an instantaneous and continuous combination of variable forces proportional to the values in question, in proper quotient relationship, so as to provide a legible and desired reading of such relationship, or a control thereof.

Quotient calculating devices have previously been provided operating upon what might be termed space movement principles, viz., wherein one indicator such as a pointer or scale is moved proportionally to one value, and a correlated pointer or scale is moved in proportion to the other value, so as to provide, by comparison, a quotient relationship between the values involved. However, such devices have certain inherent difficulties, perhaps the most prominent of which is the difficulty of visually indicating the proper quotient relationships, in a readily legible or desired manner, or in effecting proper control ratios therefrom. In accordance with the present invention, as above set forth, the quotient calculation is effected by a combination of forces; and the combination is effected in such manner that any desired scale indication or control may be provided, viz., the scale or control panel upon which the quotient determination is made may be uniformly calibrated, in a preferred embodiment, or otherwise calibrated in any desired ratio, as may be required.

It is accordingly an object of the present invention to provide an improved quotient determining or calculating mechanism, of the type set forth.

More specifically stated, it is an object of the invention to provide an improved quotient determining or calculating mechanism, wherein variable forces proportional to the values to be divided are instantaneously and continuously combined, in a manner to provide an improved indicator scale, or control panel, as the case may be.

Another object of the invention is to provide for the proper utilization of quotient determination as above set forth, in various commercial installations, such for example as in miles per gallon meters, for automotive or other vehicle use, engine efficiency determining devices, load proportioning mechanisms, fluid flow control apparatus, et cetera.

A further object of the invention is to provide an improved, more sensitive and accurate, and more legible, miles per fuel gallon indicator for self-propelled vehicles and the like.

Various other objects, advantages and features of the invention will be apparent from the following description, taken in connection with the accompanying drawings, wherein certain illustrative embodiments of use are specifically set forth.

In the drawings, wherein like reference numerals refer to like parts throughout:

Fig. 4 is a schematic view illustrating the principles of the invention as applied to a fluid flow apparatus, to provide a quotient indication of correlated fluid flow rates;

Fig. 5 is a schematic view of an installation similar to Fig. 4, but illustrating the principles of the inveniton as applied to control, as distinguished from scale indication;

Fig. 6 is a general assembly view, schematic in form, of a miles per fuel gallon indicator installation for automotive use or the like, constructed in accordance with and embodying the principles of the present invention, in accordance with one preferred embodiment thereof;

Fig. 7 is a detail view of a transmission adapter member, forming a part of the structure of Fig. 6;

Fig. 8 is a detail view of a Venturi flow measuring unit, also forming a part of the Fig. 6 structure;

Fig. 9 is a front assembly view of the indicator head structure of the miles per gallon indicator of Fig. 6;

Fig. 10 is a vertical sectional view of the indicator head, taken as indicated by the line 10—10 of Fig. 9;

Fig. 11 is a sectional view of the head, on the line 11—11 of Fig. 10;

Fig. 12 is a sectional view of the indicator head structure on the line 12—12 of Fig. 10;

Fig. 13 is a horizontal sectional view of a portion of the indicator head, on the line 13—13 of Fig. 12;

Fig. 14 is an exploded view, in perspective, of certain parts of the indicator head;

Fig. 15 is an exploded view, in perspective, of other indicator head parts;

Figs. 16 and 17 are schematic illustrative views showing the principles of the application as applied to a load proportioning mechanism, for use in railway motor units;

Figs. 18 and 19 are schematic illustrative views showing the parts of the invention applied to a load proportioning indicator for aircraft use; and Fig. 20 is a detail view of the differential mechanism forming a part of the structure of Fig. 19.

Figure 1:
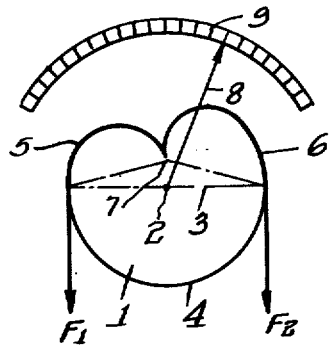
Fig. 1 is a schematic view, illustrative of certain principles involved in the present invention.

Referring to the drawings, in Fig. 1 there is diagrammatically illustrated a cam 1 having a fixed pivot 2 through which extends a horizontal median or diametral line 3. In the particular form shown, the cam surface 4, limited by the line 3, is circular and of uniform radial distance from the pivot 2; whereas the cam surfaces 5 and 6 are each of progressively diminishing radial distance from the pivot as they approach and meet at a point of minimum displacement, indicated by the reference numeral 7, lying vertically above the pivot 2. A pointer 8 is secured to the cam, at the pivot 2, and cooperates with a scale 9 the graduations of which are uniformly calibrated in Fig. 1, this result being achieved by the particular shaping of the cam surfaces. As will be noted, the cam surfaces 5 and 6, while both of decreasing radial distance from the pivot 2, are of specifically different shape.

It will be seen that if forces $F_1$ and $F_2$ are applied to the cam, in opposition, through tension cords or lines laid over the cam and anchored at the point 7, as illustrated, a force combination system is provided wherein the pivoting of the cam, and resultingly the movement of the pointer 8, is dependent upon the magnitude of the opposed forces and the effective torque arm thereof in respect to the fixed pivot 2.

Figure 2:
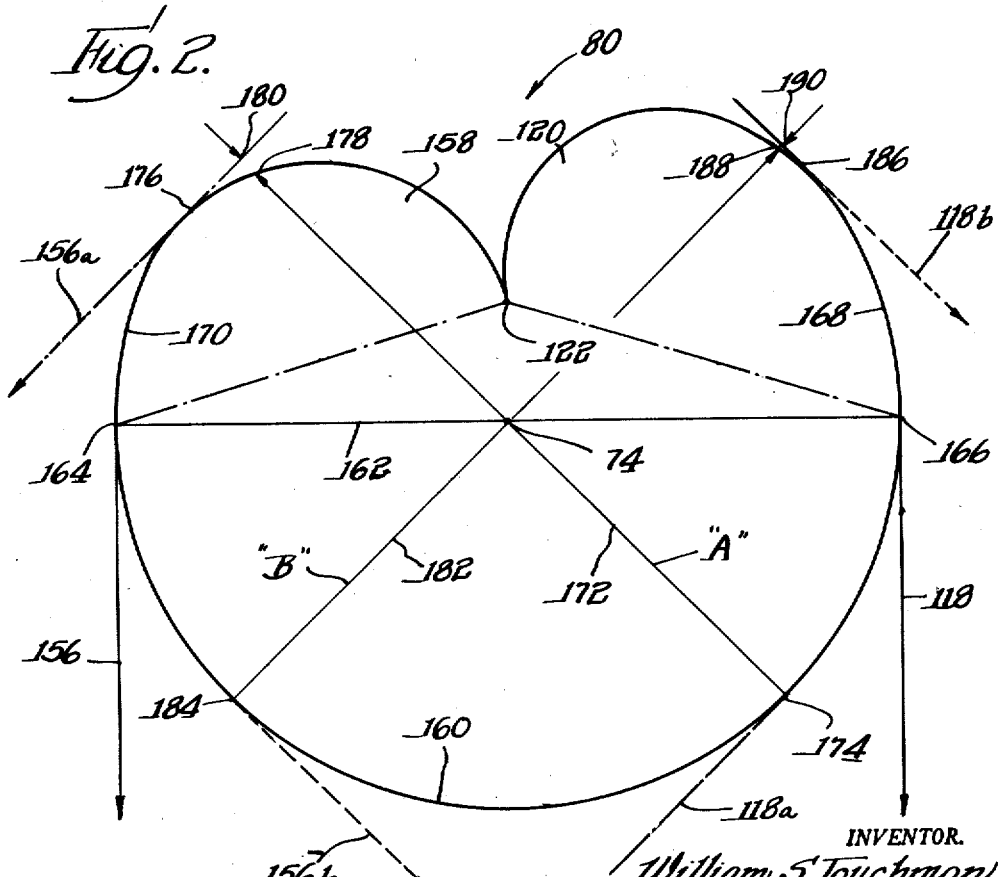
Fig. 2 is an enlarged detail view of the cam element, illustrated in Fig. 1, and in a form specifically adapted for use with the miles per gallon indicator structure hereinafter to be described, and specifically set forth in Figs. 6–15.

It is believed that the action of the cam structure, and the features and capabilities thereof, will be best understood if reference is now made to the particular application of use in the miles per fuel gallon indicator illustrated in Figs. 2, and 6–15, in connection with which the development of the cam of Fig. 2 will be specifically described.

In a self-propelled vehicle such as an automobile, boat or aircraft, the vehicle speed in miles per hour divided by the engine fuel consumption in gallons per hour provides a determination of miles per fuel gallon. In accordance with the invention, forces are generated proportional to the vehicle speed and the fuel consumption rate, and these forces in proper degree are subtractively applied to the cam device, as hereinbefore described, the cam device functioning to effect a combination of the forces and a mathematical division thereof and apply the resulting quotient to a graduated scale; to thereby provide a determination, and instantaneous and continuous indication in miles per gallon terms.

Referring to Fig. 6, there is diagrammatically illustrated a miles per gallon indicator installation which comprises an indicator head 10 suitably mounted upon a vehicle dashboard 12 in association with a speedometer 14. The functioning of the indicator is controlled conjointly from the vehicle transmission 16, through the intermediary of a flexible cable 18, and from the fuel flow line 20, forming a part of the power plant or internal combustion engine. As indicated, the flow line 20 is interposed between the engine fuel pump 22, and the engine carburetor 24, the direction of the fuel flow being indicated by the arrow 26. The carburetor is of the type provided with a float 27 which maintains a constant predetermined fuel liquid level within the carburetor chamber, so that the rate of fuel flow through the conduit 20 is at all times representative of the fuel being used by the operation of the engine.

The flow line 20 includes a Venturi 28 connected with the indicator head by means of a pair of conduits or lengths of tubing 30 and 32.

Motion proportional to the vehicle speed rate is transmitted to the indicator head from the transmission 16, through the flexible transmission cable 18, and a differential fluid pressure proportional to a function of the companion rate of fuel consumption is transmitted to the indicator head by comparative pressure conditions within the conduits 30 and 32. The indicator head structure is provided with means for generating a force proportional to a function of the vehicle speed rate, and for subtractively combining such force with a force which is a function (in the same order) of the rate of fuel consumption, and to effect a mathematical division of the values involved to provide therefrom an instantaneous and continuous miles per gallon quotient indication in respect to the fuel being used.

To adapt the unit to a standard automotive vehicle, without interference with the normal speedometer operation, an adapter 34 is provided in association with the transmission 16, the details of which are shown in Fig. 7. The adapter comprises a casing 36, secured to the transmission housing, within which is journalled a pair of shafts 38 and 40 interconnected by spur gears 42 and 44. Shaft 38 projects into the transmission housing, for driving connection with gear 46 forming a part of the transmission, the upper end of the shaft having a rotary drive socket 48 connected therewith. The shaft 40 has connected therewith a similar drive socket 52, by means of which the flexible shaft 50 of a transmission cable 18 may be driven in accordance with vehicle speed.

As will be understood, the shaft 38 is so constructed that it interconnects with the transmission drive gear 46 in the same manner as the conventional speedometer drive shaft; and the drive socket 48 is arranged to drive the flexible shaft 54 of a transmission cable 56 leading to the speedometer 14. It will accordingly be seen that by means of the adapter 34, a drive connection for the miles per gallon indicator is provided which permits the speedometer drive connections to remain substantially undisturbed, viz., by the use of the adapter 34, the conventional speedometer drive connections may be retained, with the auxiliary drive connection to the miles per gallon indicator readily provided.

As shown in Fig. 8, the Venturi 28 comprises a casing 58 having a constricted Venturi throat section 60 to which the fuel flows from a supply section 62, and from which it flows through the bell mouth outlet section 64. The pressure conduit 30 interconnects with the supply section 62, whereas the pressure conduit 32 interconnects with the Venturi throat 60, in the manner shown. As will be understood by those familiar with the operation of Venturi structures, a comparison of the pressures within conduits 30 and 32 in response to liquid flow through the Venturi, provides a measure of the liquid flow rate. More specifically, the pressure differential is proportional to the square of the instantaneous flow rate, at all times.

A Venturi device of the type provided and above described, provides an accurate measure of flow rate even under extremely low rates of fuel flow, as for example during engine idling speeds. At the same time the Venturi does not materially restrict fuel flow at high rates of consumption, so that the maximum engine performance is not impaired. The provision of the Venturi between the fuel pump and the carburetor insures that adequate pressure for the flow of the fuel through the Venturi is present, under control of the carburetor float valve, in a manner so that the Venturi cannot starve the engine, while still being highly sensitive at all times to the rate of fuel consumption.

The indicator head structure is shown in Figs. 9–13 and in the detail views, Figs. 2, 14 and 15. The indicator head comprises a dial casing 66 faced with a dial 68 upon which is embossed or otherwise imprinted miles per gallon indicia. This indicia is arranged in two series, in the embodiment shown, viz., an outer series of graduations 70 in equal spacing from zero to thirty miles per gallon, and an inner series of indicia 72 from thirty miles per gallon to infinity, in progressively smaller spacing increments.

A pivot shaft 74, Fig. 10, is journalled in the dial casing 66, upon which is carried an indicator hand, the longer portion 76 of which is arranged for cooperation with the outer indicia 70, and the shorter portion 78 of which is arranged for cooperation with the indicia 72. Also carried on the pivot shaft is an operating cam 80

(corresponding to cam 1 of Fig. 1), the details of which are illustrated in Fig. 2 and will be presently described, and a cam shield 82; the indicator hand, cam, and cam shield being suitably counterbalanced in all rotatable positions. A stop pin 84, Fig. 9, limits the rotation of the indicator hand structure to a single revolution, and also provides a limiting stop for its opposite directions of movement, in zero and infinity positions. In Fig. 9 the indicator hand is shown in its mid-position, wherein the longer end of the hand cooperates with the indicia 70 to indicate a fuel consumption of 22.5 miles per gallon.

As previously indicated, the speed rate is transmitted to the indicator head from the operating cable 50 of the flexible casing 18, the upper end of the operating cable having fixed thereto a rotatable shaft 86, Figs. 10, 12 and 16, upon which is mounted a bracket 88. As will be understood, the shaft 86 and bracket 88 rotate as a unit, with the transmission cable drive.

Bracket 88 carries a pair of weight members 90, pivotally mounted on the bracket as indicated at 92, and arranged to have their upper portions projected outwardly upon rotation of the bracket, by centrifugal force. The lower platform portions 94 of the weight members are arranged to engage and project upwardly in proportion to such centrifugal force, a pin 96, Figs. 12 and 14, formed on the end of an arm 98 of a pivotal yoke member 100, which yoke member is journalled in the casing portion 102 of the indicator head by suitable pivot connections as indicated at 104, Fig. 11. The lift pin 96 is engageable with the weight members through an opening 106, Fig. 15, provided in the bracket 88. The arrangement is such that the centrifugal force of the weight members, which is proportional to the square of the rotatable speed of the bracket 88, thrusts the lift pin 96 upwardly with a corresponding force proportional to the square of the speed.

The yoke 100 is provided with a pair of counterbalancing lugs 108, and with a rack arm 110 cooperable with and adapted to drive a gear segment 112, Fig. 11, carried by a pivot shaft 114 journalled in the dial casing and having its forward end formed as a crank arm 116, as shown in Fig. 9. The end of the crank arm is secured to a thread or cord 118 which is laid around one lobe 120, Fig. 2, of the cam 80, and anchored at its end to the cam, as indicated in Fig. 2 at 122. It will be seen that by means of the connections provided, force is exerted on the cam 80 by the cord 118, proportional to the square of the vehicle speed rate.

The relative pressures within the conduits 30 and 32, providing a measurement of fuel consumption rate, are transmitted as a pressure force to the cam by means now to be described. As best shown in Fig. 10, the conduits 30 and 32 enter the indicator head casing portion 102 through the lower section 124. As best shown in Fig. 14, this casing portion carries a block member 126 held in position on the casing by screws 128, Fig. 12. The block 126 is suitably drilled so that the conduits 30 and 32 communicate, respectively, with a pair of conduits 130 and 132, the outer ends of which are connected to and communicate with a pair of collapsible bag members 134 and 136, preferably formed of plastic or the like. When not supplied with pressure, these plastic bag members lie in collapsed position upon a pair of platforms 138 formed as a part of the casing structure. Upon the introduction of pressure fluid into the plastic bags, through the conduits 130 and 132, the bags are expansible, with a force proportional to the pressure introduced, as will be understood.

The bags engage and operate a pivot bracket 140, Figs. 11 and 14, pivotally mounted asi ndicated at 142 within the casing 124, and provided at its opposite ends with a pair of platform portions 144 and 146 adapted to overlie and be engaged with the expansible bags. It will be seen that by the arrangement thus provided, the pivotal position of the pivot bracket 140 is determined by the relative pressures within the bags.

As also best shown in Figs. 11 and 14, bracket 140 is provided with a rack portion 148 engageable with a gear sector 150 fixed to a pivot shaft 152 journalled in the dial casing, the forward end of which is formed as a crank arm 154, Fig. 9. The end of this crank arm is connected with one end of a thread or cord 156, the opposite end of which overlies a lobe 158, Fig. 2, of the operating cam 80 and is also secured to the cam at the anchorage point 122, vertically above pivot 74 in Fig. 2.

By reason of the connections thus provided, it will be seen that a pressure differential or force, proportional to the square of the fuel flow rate, is applied to the operating cam by the pulling tension in the cord 156 in opposition to the force applied to the cam by the pulling tension in the cord 118, to enable the cam to subtractively combine the forces applied.

Specific reference is made to Fig. 2. In the particular cam shown, the cam surface 160 defined by the horizontal median line 162, and lying between the points 164 and 166 is circular and equally distant at all points from the cam pivot 74. The cam surface 168 of the cam lobe 120 is of progressively decreasing radial distance from the pivot point, between the limits 166 and 122, and similarly the cam surface 170 of the cam lobe 158 is of progressively decreasing radius between the limits 164 and 122, but of specifically different contour, as compared with the cam surface 168.

With the cam in the position shown in Fig. 2, with the pointer 76 indicating a fuel consumption rate of 22.5 miles per gallon, the torque arm 74—164 of the cord 156 is equal to the torque arm 74—166 of the cord 118, viz., the cam is maintained in balance by equal forces applied to the two cords 118 and 156, respectively. That the structure is so designed that a vehicle speed of 22.5 miles per hour, and a fuel consumption rate of one gallon per hour cause equal forces to be applied to the cords; and as the centrifugal governor and the Venturi forces both vary as the square of the speed and fuel rate, respectively, similar equal forces (magnified four fold) will be applied at forty-five miles an hour with a fuel consumption rate of two gallons per hour, et cetera. Thus a proper consumption rate is indicated, at all multiple speeds.

Turning of the cam approximately 45° counterclockwise to an "A" position, to bring the line 172 into horizontal position (indicative of a fuel consumption rate of approximately 16.5 miles per gallon) results in a positioning of the cords substantially as indicated by the lines 156a and 118a. In this cam position the point of tangency 174 between the cord 118 and the cam lies along the line 172; but the point of tangency 176 is displaced a predetermined distance from the point 178 where line 172 cuts the cam surface 170. However, a projection of lines 172 and 156a defines a point 180, the distance 74–180 in turn defining the effective torque arm of the force 156a with the cam in "A" position. The torque arm 74—174 of the cord 118 being known, and the forces applied by the cords 118 and 156 also being known for the particular cam position, the length of the torque arm 74—180 may be determined, to properly match the scale indication.

In similar manner the cam surface 170 may be determined for all cam positions between zero and 22.5 miles per gallon, for all scale markings.

Rotation of the cam 45° in a clockwise direction to a "B" position so as to bring the line 182, Fig. 2, into horizontal (a cam position assumed at approximately 28 miles per gallon) results in a cord condition as indicated at 156b and 118b. In this condition the point of tangency 184 of the cord 156 lies on the line 182, whereas the point of tangency 186 of the cord 118 is displaced a distance from the point 188 where the line 182 cuts the surface of the cam lobe. As in the previous example, a projection of lines 182 and 118b defines a point 190 which in turn defines an effective torque arm 74—190 for the force 118b, which can thus be determined to match the scale reading, having in mind the known torque arm 74—174, and the known forces of the cords at the "B" cam position. As in the case of the cam surface 170, the contour of the cam surface 168 may be thusly determined for all scale pointer positions between 22.5 miles per gallon and infinity.

By this means a cam contour may be developed to accomodate any desired system of scale graduations. Thus in the particular miles per gallon indicator set forth, graduations in equal spacing are provided between zero and thirty miles per gallon, for maximum legibility and ease of reading within the normal utility range, whereas the graduations from thirty miles per gallon to infinity are of progressively decreased numerical spacing; and the cam is calculated to accommodate the particular scale graduation system provided. The inherent difficulty of indicators having graduations in progressive spacing throughout their range, or graduations of inadequate spacing within a particular desired range, are avoided.

In the operation of the structure, the pulling forces exerted by the cords 118 and 156 upon the cam, in opposition, effect the movements of the pointer 76—78 to provide a continuous instantaneous reading, at all times, of the miles per gallon performance of the engine, either upon scale 70 or scale 72, as the case may be. The limit positions of the cam are substantially 180° in either direction from the position shown in Fig. 2, bringing the pivot 74 and anchorage point 122 to a position vertically transposed from that shown in Fig. 2.

In each position the cam is in balance, the effective torque arms of the applied forces being inversely proportional to the magnitude of the forces applied; and the applied forces are in the same order, viz., the "square" of the speed and fuel rate, respectively.

In the device of the invention the cam surfaces are so generated that in each cam position the ratio between the effective torque or force arms is proportional to the square of the corresponding scale division (number) multiplied by the difference between the logarithms of the two applied forces; or otherwise stated, the ratio between the torque arms, as the cam turns, varies as (or proportional to) the square of the corresponding scale division number multiplied by the difference between the logarithms of the applied forces. In this manner the device functions to effect a division or quotient determination of the applied force values by what is in effect a subtraction of logarithms of the subtractively applied forces.

In the device of the invention there is, furthermore, a parabolic relationship between the ratio of the torque arms of the cam, and the divisions of the indicator scale. Thus, if the force arm ratio, as ordinates, were plotted for each cam position against uniformly calibrated scale divisions, as abscissa, a parabolic curve would be produced; or if the scale divisions were parabolically set out or calibrated, then the produced curve would become a straight line. In other words, with uniform scale divisions upon the indicator scale the cam arm ratios are parabolically related, or vary as a parabola, as the cam turns; or stated more generally, the cam surfaces are so generated as to provide force or torque arms, the ratio of which, as the cam turns, deviates from a parabolic relationship by values corresponding with the deviation of the scale divisions from uniform calibrations.

The cam mechanism, in combination with the speed and fuel flow force supplying means, provides sensitivity and immediate response under all conditions of operation. The plastic expansion bags or force members 134 and 136 have no inherent resiliency and thus require no spring rate compensation. Preferably the bags and the lines 30 and 32 are maintained full of the liquid fuel, at all times, for the exclusion of air and vapor, thus providing a rapid response of the pressure members to Venturi pressure conditions. In this connection it is to be noted that the bags become completely collapsed in the opposite extreme positions of the rock member, to effect the elimination of air and vapor.

The fixed pivot axis 74 permits the proper application of the variable forces to the cam in balanced relation.

Figure 3:
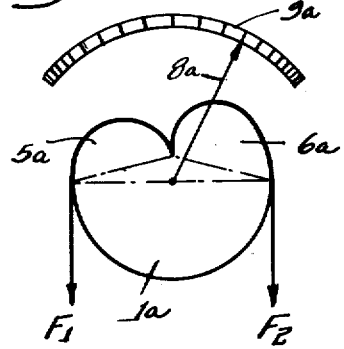
Fig. 3 is an illustrative view, similar to Fig. 1, but showing a modified control cam and scale calibration.

The manner in which the structure may be readily adapted to accommodate any selected scale, is indicated in Fig. 3, wherein it will be seen that by the provision of essentially the same type cam, but by appropriate modification of the cam lobes 5a and 6a, a scale 9a may be provided having graduations which are widely spaced at the central range thereof for maximum legibility within such range.

In Fig. 4 the principles of the invention are shown applied to a fluid flow control system wherein there is provided a pipe system 200 and a pipe system 202, as to which proportionate flow determinations are to be made. Pipe system 200 includes a Venturi 204 connected by means of pressure lines 206 and 208 with a piston and cylinder diagrammatically indicated at 210; so that a resulting tension is applied to cord 212 in proportion to the rate of fluid flow. Similarly the piping 202 includes a Venturi 214 connected by means of conduits 216 and 218 with a piston and cylinder diagrammatically indicated at 220, in a manner so that pull or tension is applied to the cord 222 in proportion to the liquid flow within the pipe line or system 202. By means of the cam calculating system 224, as hereinbefore described, instantaneous readings will be given at all times upon the scale 226 determinative of the flow rate proportion in the two pipe line systems. If desired, the pointer may further include a stylus extension 228 cooperative with a clock driven web or tape 230 so as to provide a continuous record of the proportionate flow, as will be understood.

In Fig. 5 an installation similar to Fig. 4 is illustrated, but wherein the principles of the invention are adapted to effect a control, in accordance with the quotient relationships determined. Thus in this instance if flow within the line 200a is varied by means of the manual control valve 232, the flow within the line 202a will be automatically simultaneously varied to maintain a constant proportion between the flow rates in the two lines. To this end the cam mechanism is provided with a contact arm 234, the contact 236 of which lies between stationary contactors 238 and 240, in a manner so that when the arm 234 tends to shift from the desired proportion the reversible motor 242 is operated in one direction or the other to variably adjust valve mechanism 244, to thereby control the flow within line 202a and maintain the two pipe line flow lines in the desired preset relation. The proportionate flow rate to be maintained may be adjusted by the variable positioning of the block carrying contacts 238 and 240, along the track structure 246; and by employing the principles heretofore described in reference to Fig. 3, the control may be made particularly sensitive, in desired degree, at any controlled point.

In Figs. 16 and 17 the principles of the invention are shown as applied to a load proportioning mechanism for use with railway power units, to indicate the load proportion therebetween.

In many instances wherein multiple power units are employed to carry a single load, it is difficult to ascertain the effective work being done by each unit, so as to maintain the proper load relationship therebetween. Thus, for example, in multiple power unit trains, frequently one unit inadvertently carries a disproportionate share of the load, causing premature breakdown or deterioration of one unit, and an underloading of the other.

In Fig. 16 a multiple power unit train is diagrammatically illustrated comprising two power units indicated at 250 and 252, respectively, arranged to pull a train of cars the first of which is indicated by he reference numeral 254. In most instances it is desirable that the power units 250 and 252 shall share the load equally, viz., so that the pull at the draw-bar 256 shall be one-half the pull at the draw-bar 258.

To indicate, and thus maintain, the relationship between the draw-bar loads, the apparatus of the present invention may be employed, as diagrammatically indicated in Fig. 17. As illustrated, the draw-bar 256 has associated therewith a cylinder 260 and piston 262 so arranged that the load of the draw-bar is transmitted through the piston rod 264. Similarly the draw-bar 258 is provided with a cylinder 266 and piston 268 so arranged that the draw-bar load is transmitted through the associated piston rod 270. Cylinder 270 is in communication with a smaller cylinder 272 by means of a conduit 274, the latter cylinder having therein a piston 276 interconnected by means of its piston rod to the short arm of a lever 278 pivoted as indicated at 280, the long arm of the lever being connected to a pull cord 282 connected to one lobe of the calculating cam 284, of the type hereinbefore described. Similarly the cylinder 266 is interconnected by means of a conduit 286 with a cylinder 288, the piston 290 of which connects with the short arm of a pivoted lever 292, the long arm of which is arranged to tension a pull cord 294 connected with the other side of the calculating cam 284. Cam 284 has secured thereto an indicator arm 296 cooperating with a scale 298, as in the embodiment heretofore described.

It will be seen that by means of the connections provided the indicator scale 296—298 will indicate the load proportion between the draw-bars; and if the indicator is suitably mounted in the control cab, the engineer may readily maintain the proper load relation between the power units by throttle adjustment of the engines. As will be understood, the cylinders 272 and 288 may be made relatively small in relation to their associated cylinders 260 and 266, respectively (Fig. 17 being only a diagrammatic view), so as to transmit a relatively small tension to the pull cords 282 and 294. This tension is further reduced through the action of the levers 278 and 292, and further reducing linkage may be easily provided, if desired.

In Figs. 18–20 a load proportion indicator, operating in accordance with the principles of the invention, is shown applied to an aircraft installation, to indicate the load proportion relation between the engines of a multiple engine airplane.

In Fig. 18 an airplane 300 is diagrammatically indicated having engines 302 and 304, the drive shafts thereof, respectively, being indicated by the numerals 306 and 308.

In the diagrammatic view, Fig. 19, drive shafts 306 and 308 are shown interconnected with the indicator device of the invention.

More specifically, shaft 306 is provided with gears 310 and 312 carried thereby in spaced relation, gear 310 meshing with a pinion 314, and gear 312 meshing with a pinion 316, through an interconnecting idler pinion 318, so that the pinions or gears 314 and 316 are driven in opposite directions of rotation as the engine drive shaft 306 rotates.

As best shown in Fig. 20, pinions 314 and 316 are interconnected by means of a standard differential 320, the third or output shaft of which is indicated by the numeral 322.

As the engine drive shaft 306 rotates, equal and opposite rotation movements are imparted to the pinions 314 and 316 so that as the result of such drive shaft rotation no movement is imparted to the differential output shaft 322, viz., the equal and opposite rotation of the differential drive shafts 324 and 326 produces no resultant movement of the differential ring gear 328, and resultingly no differential movement of the differential output shaft.

However, as is known, a twist will be imparted to the engine drive shaft 306, under load, proportional to the load transmitted by the shaft, which results in a differential rotation being imparted to the spaced gears 310 and 312, as indicated by the arrows 330 and 332. This relative gear movement when applied through the differential 320 results in a corresponding motion transmitted to the differential output shaft 322 in proportion to the drive shaft twist, and resultingly in proportion to the drive shaft load.

The output shaft 322 is provided with a pinion 334 meshing with a rack 336 which is connected to one end of a spring 338, the other end of which is connected to the pull cord 340 connected to one side of the calculating cam 342, of the type hereinbefore described.

It will be seen that by reason of the connections provided, a tension is transmitted, through the action of the spring, to the cord 340 in proportion to the load transmitted by the engine drive shaft 306.

In a manner similar to the connections above described, engine drive shaft 308 is provided with similarly spaced gears 344 and 346 meshing with pinions 348 and 350, respectively, which are arranged through differential 352 to drive a pinion 354 an amount proportional to the twist and the load transmitted by engine drive shaft 308. Pinion 354, through the action of rack 356, and spring 358, is arranged to transmit tension to a pull cord 360, connected to the opposite side of the cam as hereinbefore described, so that the cam position is controlled to indicate the load relationship or proportion, through the action of the associated indicator 362 and scale 364.

In this manner the proper load relationship may be indicated and thus maintained between the multiple engines, by adjustment of the engine throttles, as in the arrangement of Figs. 16 and 17. As will be understood, in a 4-engine aircraft each engine load may be compared with a standard (viz., one cam cord being connected to substantially constant tension spring) four indicators thus being provided for the four engines, respectively, by means of which the pilot may equalize the engine loads by suitable throttle adjustment.

In the structure of Figs. 18–20, as in Figs. 16–17 and the other structures set forth, the force applying means are devoid of any appreciable resiliency or spring rate, whereby the cam functions as a pure force responsive device, and not as a space or distance responsive device, wherein the space or distance applied movements may be force induced. This force responsive characteristic of the device enables it to function in accordance with the principles of the invention hereinbefore set forth.

It is obvious that various changes may be made in the specific embodiments set forth, without departing from the spirit of the invention. The invention is accordingly not to be limited to the particular embodiments shown and described, but only as indicated in the following claims.

The invention is hereby claimed as follows:

1. A quotient determining device comprising a pivoted cam, the cam having a predetermined cam contour, and force members acting upon the cam in opposing relation, said force members comprising elongated flexible elements anchored to the cam at their ends and overlying the cam surfaces and extending from the cam on the opposite sides thereof, the force members and cam being interconnected to vary the effective force arms of the force members in accordance with said cam contour.

2. A quotient determining device comprising a pivoted cam, the cam having a predetermined cam contour, and force members acting upon the cam in opposing relation, said force members comprising elongated flexible elements anchored at their ends to the cam at a substantially common point spaced from the cam pivot axis and overlying the cam surfaces and extending from the cam on the opposite sides thereof, the force members and cam being interconnected to vary the effective force arms of the force members in accordance with said cam contour.

3. A quotient determining device comprising a pivoted cam, the cam having a predetermined cam contour presenting between the cam pivot and cam surface substantially opposed force arms relatively varying as the cam pivots, force members connected in surface engagement with said cam for acting upon the cam in opposing relation to vary the effective force arms of the force members in accordance with said cam contour, and an indicator actuated by the movements of the cam as the cam pivots, the indicator having a calibrated dial, the cam surfaces being so shaped as to provide effective torque arms for the force members the ratio of which varies as the square of the corresponding indicator scale division number multiplied by the difference between the logarithms of the applied forces.

4. A quotient determining device comprising a pivoted cam, the cam having a predetermined cam contour presenting between the cam pivot and cam surface substantially opposed force arms relatively varying as the cam pivots, force members connected in surface engagement with said cam for acting upon the cam in opposing relation to vary the effective force arms of the force members in accordance with said cam contour, and an indicator actuated by the movements of the cam as the cam pivots, the indicator having a calibrated dial, the cam surfaces being so shaped as to provide torque arms for the force members, the ratio of which as the cam turns, deviates from a parabolic relationship by values corresponding with the deviation of the dial calibrations from a uniform disposition.

5. A quotient determining device comprising a pivoted cam, the cam having a predetermined cam contour presenting between the cam pivot and cam surface substantially opposed force arms relatively varying as the cam pivots, force members connected in surface engagement with said cam for acting upon the cam in opposing relation to vary the effective force arms of the force members in accordance with said cam contour, and an indicator actuated by the movements of the cam as the cam pivots, the indicator having a calibrated dial, the dial calibrations being uniformly disposed, and the cam surfaces being generated so as to provide torque arms for the force members, the ratio of which varies as a parabola upon uniform turning movement of the cam.

6. A quotient determining device comprising a pivoted cam, the cam having a predetermined cam contour presenting between the cam pivot and cam surface substantially opposed force arms relatively varying as the cam pivots, force members connected in surface engagement with said cam for acting upon the cam in opposing relation to vary the effective force arms of the force members in accordance with said cam contour, and a control member actuated by the movements of the cam as the cam pivots, said control member controlling the force of at least one of said force members.

7. A quotient determining device as defined in claim 6, wherein said control member comprises an electrical contactor interconnected with the cam for movement therewith.

8. A fluid flow proportioning device comprising means forming a first conduit flow line, means forming a second conduit flow line, a pivoted cam, said cam having a predetermined cam contour presenting between the cam pivot and cam surface substantially opposed force arms relatively varying as the cam pivots, a flow detecting member in the first conduit, a flow detecting member in the second conduit, and force members operated by the detecting members, respectively, connected in surface engagement with said cam for acting upon the cam in opposing relation to vary the effective force arms of the force members in accordance with said cam contour as the cam pivots.

9. A fluid flow proportioning device comprising means forming a first conduit flow line, means forming a second conduit flow line, a pivoted cam, said cam having a predetermined cam contour presenting between the cam pivot and cam surface substantially opposed force arms relatively varying as the cam pivots, a flow detecting member in the first conduit, a flow detecting member in the second conduit, force members operated by the detecting members, respectively, connected in surface engagement with said cam for acting upon the cam in opposing relation to vary the effective force arms of the force members in accordance with said cam contour as the cam pivots, and an indicator operated by the movements of the cam to thereby indicate the flow proportion within said conduits.

10. A fluid flow proportioning device comprising means forming a first conduit flow line, means forming a second conduit flow line, a pivoted cam, said cam having a predetermined cam contour presenting between the cam pivot and cam surface substantially opposed force arms relatively varying as the cam pivots, a flow detecting member in the first conduit, a flow detecting member in the second conduit, force members operated by the detecting members, respectively, connected in surface engagement with said cam for acting upon the cam in opposing relation to vary the effective force arms of the force members in accordance with said cam contour as the cam pivots, and control means operated by the movements of the cam to control the fluid flow within at least one of said conduits to thereby maintain the flow proportion between the conduits at a preset value.

11. A load balancing mechanism comprising a first load transmitting member, a second load transmitting member, a pivoted cam, the cam having a predetermined cam contour presenting between the cam pivot and cam surface substantially opposed force arms relatively varying as the cam pivots, and force members connected, respectively, to the load transmitting members and connected in surface engagement with said cam for acting upon the cam in opposing relation the force members being connected to vary the effective force arms of the force members upon the cam in accordance with said cam contour.

12. A load balancing mechanism as defined in claim 11, wherein each of said load transmitting members includes an axially shiftable part for transmitting an axial thrust load.

13. A load balancing mechanism as defined in claim 11, wherein each of said load transmitting members includes a rotary part for transmitting a rotary load.

14. An engine efficiency determining device comprising means responsive to engine performance to produce a force, means responsive to engine fuel consumption to produce a force, a pivoted cam, the cam having a predetermined cam contour presenting between the cam pivot and cam surface substantially opposed force arms relatively varying as the cam pivots, a pair of force transmitting means connected to and operated respectively by each of said force producing means and connected in surface engagement with said cam for acting upon the cam in opposing relation to vary the effective force arms of the force members in accordance with said cam contour, and an indicator actuated by the movements of the cam, the indicator having a calibrated dial, the cam surfaces being so shaped as to provide effective torque arms for the force members the ratio of which varies as the square of the corresponding indicator scale division number multiplied by the difference between the logarithms of the applied forces.

15. An engine efficiency determining device comprising means responsive to engine performance to produce a force, means responsive to engine fuel consumption to produce a force, a pivoted cam, the cam having a predetermined cam contour presenting between the cam pivot and cam surface substantially opposed force arms relatively varying as the cam pivots, a pair of force transmitting means connected to and operated respectively by each of said force producing means and connected in surface engagement with said cam for acting upon the cam in opposing relation to vary the effective force arms of the force members in accordance with said cam contour, and an indicator actuated by the movements of the cam, the indicator having a calibrated dial, the cam surfaces being so shaped as to provide torque arms for the force members, the ratio of which as the cam turns, deviates from parabolic relationship by values corresponding with the deviation of the dial calibrations from a uniform disposition.

16. A miles per gallon indicator for internal combustion engines comprising means responsive to engine speed for producing a force, means responsive to engine fuel consumption for producing a force, a pivoted cam, the cam having a predetermined cam contour presenting between the cam pivot and cam surface substantially opposed force arms relatively varying as the cam pivots, a pair of force transmitting means connected to and operated respectively by each of said force producing means and connected in surface engagement with said cam for acting upon the cam in opposing relation to vary the effective force arms of the force members in accordance with said cam contour, and an indicator actuated by the movements of the cam, the indicator having a calibrated dial, the cam surfaces being so shaped as to provide effective torque arms for the force members the ratio of which varies as the square of the corresponding indicator scale division number multiplied by the difference between the logarithms of the applied forces.

17. A miles per gallon indicator for internal combustion engines comprising means responsive to engine speed for producing a force, means responsive to engine fuel consumption for producing a force, a pivoted cam, the cam having a predetermined cam contour presenting between the cam pivot and cam surface substantially opposed force arms relatively varying as the cam pivots a pair of force transmitting means connected to and operated respectively by each of said force producing means and connected in surface engagement with said cam for acting upon the cam in opposing relation to vary the effective force arms of the force members in accordance with said cam contour, and an indicator actuated by the movements of the cam, the indicator having a calibrated dial, the cam surfaces being so shaped as to provide torque arms for the force members, the ratio of which as the cam turns, deviates from parabolic relationship by values corresponding with the deviation of the dial calibrations from a uniform disposition.

18. A quotient determining device comprising pivotal cam means having predetermined cam contour presenting substantially opposed relatively variable force arms, a pair of force producing means responsive to separate functions, a pair of force transmitting means respectively responsive to said force producing means and engaging the cam means for acting thereupon in opposing relation to vary the effective force arms within the cam means according to the predetermined cam contour as the cam means pivots, said cam means being shaped to provide force arms varying as the square of a given increment of movement of the cam means multiplied by the difference between the logarithms of the applied forces, and means operable by said cam means to provide a response in accordance with the quotient of the functions.

19. A quotient determining device as defined in claim 18 wherein said last named means includes means for indicating the quotient of the functions.

20. A quotient determining device as defined in claim 18 wherein said last named means includes means for controlling at least one of the functions in accordance with the quotient of the functions.

21. An engine function efficiency meter comprising force producing means responsive to engine performance, force producing means responsive to engine fuel consumption, and means to combine the forces of said performance and fuel consumption means to provide a determination of engine function efficiency, said combining means comprising a rotatable cam member, and force transmitting means connected in overlying surface engagement with the cam member in opposing relationship and respectively interconnecting the cam member and said performance and fuel consumption force producing means and transmitting opposing forces tending to rotate the cam member in opposite directions.

22. An engine function meter as defined in claim 21, wherein said interconnecting means comprises a pair of flexible cords connected at one end to said performance and fuel consumption force producing means, respectively, and at their other ends to said cam member.

23. A miles per gallon indicator for internal combustion engines comprising force producing means responsive to engine speed, force producing means responsive to engine fuel consumption, and means to combine the forces of said speed and fuel consumption means, said combining means comprising an indicator, a rotatable cam member for operating the indicator, and force transmitting means connected in overlying surface engagement with the cam member in opposing relationship and respectively interconnecting said cam member and said speed and fuel consumption force producing means and transmitting opposing forces tending to rotate said cam member in opposite directions.

24. A miles per gallon indicator as defined in claim 23, wherein said interconnecting means comprises a pair of flexible cords, said cords being connected at one end to the cam and at their other ends, respectively, to said speed and fuel consumption force producing means.

25. A miles per gallon indicator for internal combustion engines comprising force means responsive to engine speed, force means responsive to engine fuel consumption, and means to combine the forces of said speed and fuel consumption means, said combining means comprising an indicator, and a rotatable cam member for operating the indicator, said cam member having a generally circular portion, and a pair of portions of decreasing radius at the opposite ends thereof, and a pair of force transmitting means connected in overlying surface engagement with said cam member in opposing relationship and respectively connected to said speed and fuel consumption responsive means so that the cam is urged in opposite directions by said speed and fuel consumption force means.

26. A miles per gallon indicator for internal combustion engines comprising force means responsive to engine speed, force means responsive to engine fuel consumption, and means to combine the forces of said speed and fuel consumption means, said combining means comprising an indicator, a rotatable cam member for operating the indicator, and a pair of flexible cords interconnecting the cam member respectively with said speed and fuel consumption force means, said cam member having peripheral portions of varying radius in respect to the pivot axis of the cam, said cords being connected to the cam peripheral portion of minimum radius and extending in opposite directions therefrom.

27. A quotient determining device comprising pivoted cam means having a surface with a predetermined contour presenting substantially opposed relatively variable force arms between the pivot for the cam means and the cam surface, said cam means surface having a first section comprising a substantial arc of a circle and a pair of sections of diminishing radii respectively joining opposite ends of said first section, a pair of force producing means responsive to separate functions, a pair of force transmitting means respectively actuated in opposing relationship by said force producing means and effectively acting in opposing relationship on said cam surface to vary the effective force arms of the force transmitting means according to the predetermined cam contour as the cam means pivots, one of the force transmitting means acting against the surface of said first section when the other force transmitting means is acting against the surface of one of the second mentioned sections, and means operable by said cam means to provide a response in accordance with the quotient of said functions.

References Cited in the file of this patent

UNITED STATES PATENTS

| | | |
|---|---|---|
| 1,225,527 | Thompson | May 8, 1917 |
| 2,250,739 | Ahlstrom et al. | July 29, 1941 |
| 2,268,549 | Kennedy | Jan. 6, 1942 |

FOREIGN PATENTS

| | | |
|---|---|---|
| 197,321 | Great Britain | July 10, 1924 |
| 649,148 | France | Dec. 18, 1928 |
| 169,754 | Switzerland | Sept. 1, 1934 |
| 707,282 | Germany | May 15, 1941 |

OTHER REFERENCES

Product Engineering for Nov. 1949, pp. 121–124, article entitled, Mechanical Computing Mechanisms by Reed et al.

UNITED STATES PATENT OFFICE

CERTIFICATE OF CORRECTION

Patent No. 2,806,647 September 17, 1957

William S. Touchman

It is hereby certified that error appears in the printed specification of the above numbered patent requiring correction and that the said Letters Patent should read as corrected below.

Column 6, line 35, for "That" read -- Thus --; column 8, line 71, for "he" read -- the --; column 9, line 24, for "embodiment" read -- embodiments --; column 12, lines 36 and 37, strike out "the force members being connected".

Signed and sealed this 12th day of November 1957.

(SEAL)
Attest:
KARL H. AXLINE
Attesting Officer

ROBERT C. WATSON
Commissioner of Patents